United States Patent
Sakaguchi et al.

[11] Patent Number: 5,906,555
[45] Date of Patent: May 25, 1999

[54] HYDRAULIC PRESSURE CONTROL SYSTEM

[75] Inventors: Shinya Sakaguchi, Kariya; Kazushi Nakatani; Akira Takagi, both of Obu, all of Japan

[73] Assignee: Denso Corporation, Japan

[21] Appl. No.: 08/870,412

[22] Filed: Jun. 5, 1997

[30] Foreign Application Priority Data

Jun. 6, 1996 [JP] Japan ............... 8-144338
Mar. 18, 1997 [JP] Japan ............... 9-064965

[51] Int. Cl.$^6$ ............... F16H 61/00
[52] U.S. Cl. ............... 475/61; 477/174; 477/169; 475/127; 475/65
[58] Field of Search ............... 475/127, 131, 475/116, 60, 61, 65; 477/169, 174, 175, 62

[56] References Cited

U.S. PATENT DOCUMENTS

| | | | |
|---|---|---|---|
| 4,660,693 | 4/1987 | Taga et al. | 477/166 X |
| 4,858,500 | 8/1989 | Harada et al. | 475/61 X |
| 5,178,042 | 1/1993 | Moroto et al. | 477/121 X |
| 5,319,559 | 6/1994 | Kusaka et al. | 477/115 X |
| 5,339,935 | 8/1994 | Ishii et al. | 475/65 X |
| 5,498,217 | 3/1996 | Maruyama et al. | 477/169 |
| 5,518,469 | 5/1996 | Wakahara | 477/158 X |
| 5,542,888 | 8/1996 | Takada et al. . | |
| 5,590,751 | 1/1997 | Jang et al. | 477/169 X |
| 5,637,053 | 6/1997 | Droste et al. | 477/169 X |
| 5,641,043 | 6/1997 | Niiyama | 475/65 X |
| 5,649,880 | 7/1997 | Tsutsui et al. | 477/175 X |
| 5,701,982 | 12/1997 | Nakatani et al. . | |
| 5,707,316 | 1/1998 | Tanahashi et al. | 477/156 X |

FOREIGN PATENT DOCUMENTS 9-112685  5/1997  Japan .

OTHER PUBLICATIONS

U.S. Patent Application No. 08/778,259.

Primary Examiner—Dirk Wright
Assistant Examiner—Peter T. Kwon
Attorney, Agent, or Firm—Pillsbury Madison & Sutro, LLP

[57] ABSTRACT

A hydraulic pressure control system for an automatic transmission is capable of reducing the size and simplifying the structure of a lockup controlling hydraulic circuit. An oil pressure output from a solenoid valve acts on an oil pressure chamber. The internal pressure of another oil pressure chamber becomes high only in a forward low-speed range and becomes low in all of the other gear shift ranges. The internal pressure of another oil pressure chamber becomes high only in forward ranges and becomes low in neutral and reverse ranges. The valve member moves in accordance with oil pressures applied to the oil pressure chambers to change over oil paths connected to a clutch control oil chamber and a torque converter oil chamber, whereby a lockup clutch assumes one of engaged, slip, and released states. Since an oil pressure signal according to a gear shift range and a vehicular running range is fed to the changeover valve and on the basis of this signal the changeover valve determines whether the engagement of the lockup clutch is to be permitted or inhibited, the circuit of a lockup control unit can be reduced in size and simplified.

14 Claims, 6 Drawing Sheets

HYDRAULIC PRESSURE CONTROL SYSTEM

BACKGROUND OF THE INVENTION

1. Field of the Invention

The present invention relates to a hydraulic pressure control system for controlling a speed change mechanism of an automatic transmission hydraulically.

2. Description of Related Art

In a conventional automatic transmission which is often used for vehicles and the like, the hydraulic pressure to be applied to frictional coupling elements is controlled in a changeover fashion by means of a hydraulic pressure control valve. Shift control is performed by a manual operation using a shift lever which is operated by a driver to select one of forward, neutral and reverse gear shift ranges, or an automatic gear shift using an automatic transmission controlling computer, or an electronic control unit which determines a coupled or uncoupled state of friction coupling elements so as to give an appropriate gear ratio in accordance with a throttle valve opening of an engine.

Japanese Patent Application No. Hei 7-264171 proposes a type of a hydraulic pressure control system for an automatic transmission which is provided with a lockup clutch for preventing the occurrence of slip in a torque converter at the time of power transfer from an engine and thereby improving the power transfer efficiency. The hydraulic pressure control system described therein includes, as lockup controller, a changeover valve for changing over oil paths between a release chamber and a locking chamber of a lockup clutch, and a solenoid valve for controlling the hydraulic pressure of the release chamber. Such a lockup controller is usually provided with a gear shift range determining valve which generates a lockup permit signal according to a vehicular gear shift range to operate the changeover valve.

In the above conventional hydraulic pressure control system, however, it is necessary to use a gear shift range determining valve as the lockup controller in addition to a direction change-over valve which is constituted by a spool valve. Consequently, there has been the problem that a hydraulic circuit used in the lockup controller becomes complicated and larger in size.

SUMMARY OF THE INVENTION

In view of the above problems of the prior art, it is an object of the invention to provide a hydraulic pressure control system for an automatic transmission capable of reducing the size and simplifying the structure of a lockup controlling hydraulic circuit.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

An embodiment of the present invention will be described in detail hereinunder with reference to the accompanying drawings.

Figure 2:
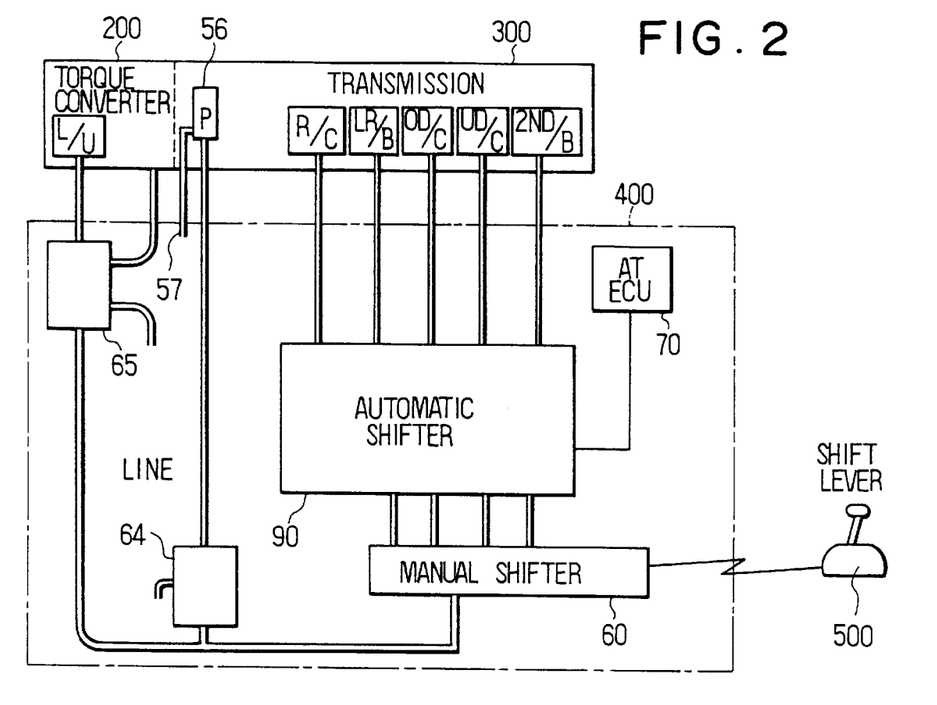
FIG. 2 is a block diagram showing a system configuration of an automatic transmission to which the hydraulic control system is applied.

FIG. 2 shows a system configuration of an automatic transmission (hereinafter referred to simply as "AT") for a vehicle to which is applied a hydraulic pressure control system embodying the present invention.

The AT transmits a torque generated in an engine to a speed change drive unit through a hydraulic power transfer unit such as a torque converter, and the power is then subjected to a speed change by a plurality of planetary gears disposed within the speed change drive unit to provide a shifted output.

The connection of gears in a transmission 300 is switched over from one to another automatically or manually and a rotating force from the engine connected to a torque converter 200 is transmitted to rear or front wheels of the vehicle. The whole of an automatic speed change unit 90 and related peripheral devices is disposed within an oil pan (not shown) located in the interior of the AT which underlies the transmission 300, and the space around a hydraulic control system 400 disposed in the interior of the oil pan is utilized as a drain of a hydraulic circuit.

Within the transmission 300 is mounted a known hydraulic pump 56 which is connected directly to the drive shaft of the engine and is rotated thereby. The hydraulic pump 56 functions to suck through a suction port 57 driving oil which has been discharged to the oil pan from each hydraulic unit and supply pressurized oil to each hydraulic unit through a line pressure control unit 64. This pressurized oil from the hydraulic pump 56 is of a high pressure which varies, and the pressure thereof is controlled at a constant high line pressure by the line pressure control unit 64. This oil pressure is then supplied to various hydraulic devices. Frictional coupling elements are connected to gears which constitute various change gear ratios respectively, such as planetary gears (not shown), mounted within the transmission 300. By coupling or uncoupling the frictional coupling elements, switching is made from one change gear ratio to another to control the vehicle speed. A lockup control unit 65 is associated with a L/U (lockup device) to adjust the oil pressure.

Figure 1:
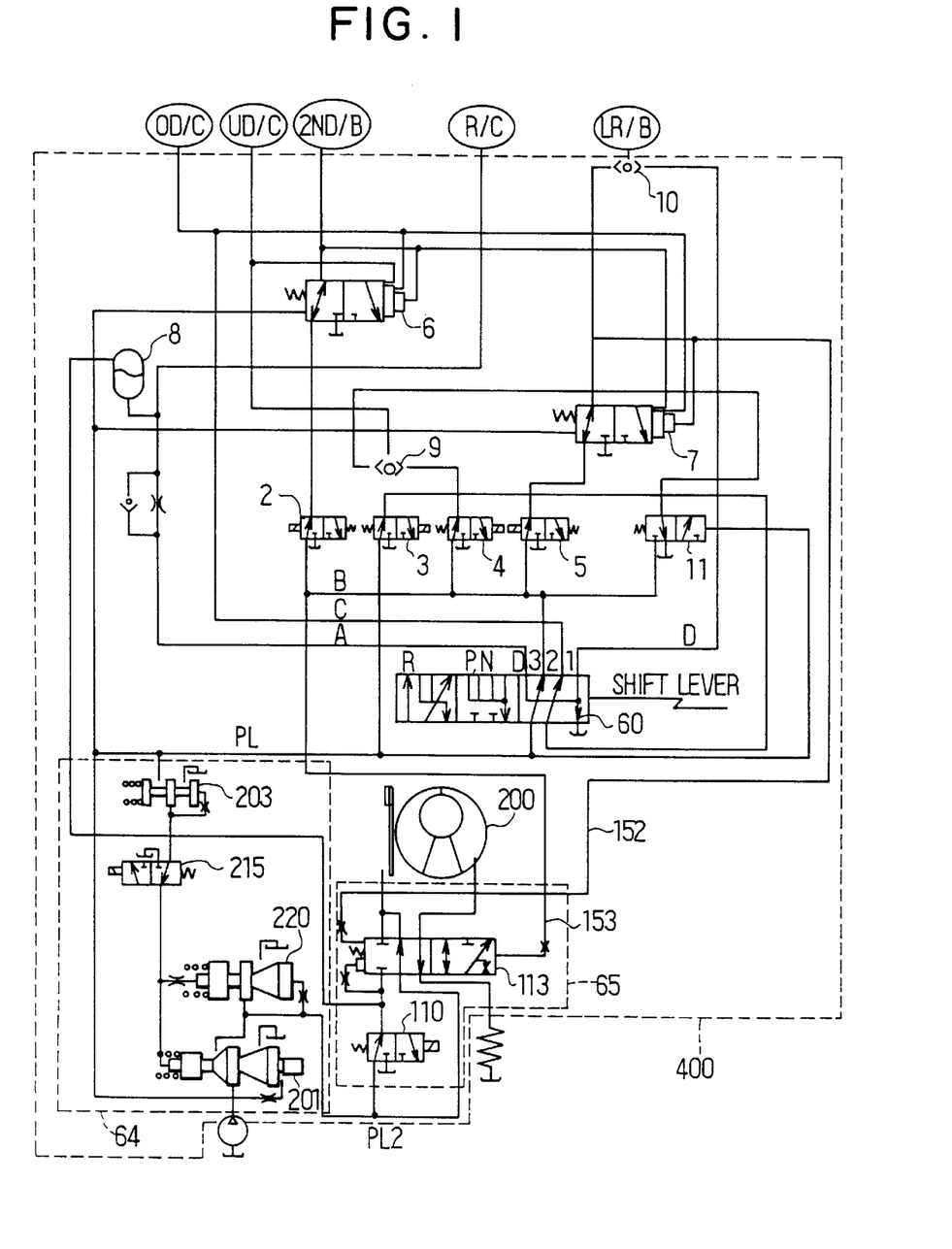
FIG. 1 is a schematic hydraulic circuit diagram showing a hydraulic pressure control system according to an embodiment of the present invention.
Figure 3:
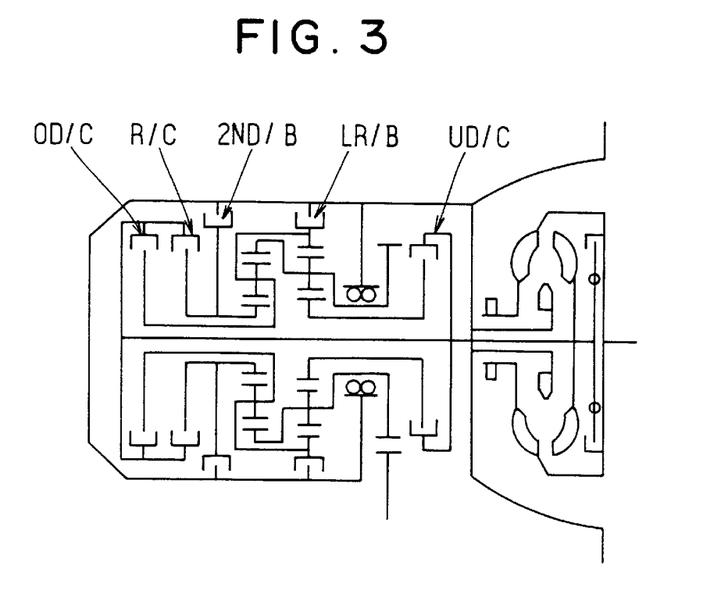
FIG. 3 is a schematic construction diagram showing the frictional coupling elements.

A hydraulic circuit of the hydraulic pressure control system 400 is shown in FIG. 1. In the hydraulic pressure control system 400 are included a manually operated valve 60, the line pressure control unit 64 and the lockup control unit 65. The hydraulic circuit shown in FIG. 1 corresponds to the gear train shown in FIG. 3 and it is provided with fail safe valves 6 and 7 for preventing double lock which involves internal locking of an input shaft. In FIG. 1, OD/C, UD/C, 2ND/B, R/C, and LR/B, stand for "frictional coupling elements" recited in the claims.

In FIG. 1, the manually operated valve 60, which serves as a manual changeover unit, operates mechanically to interlock with the shift lever and has three positions corresponding to shift positions. In forward ranges (D, 3, 2, 1), the manually operated valve 60 puts pressure passages B and C into communication with a line pressure PL or a control pressure PC to render pressure passages A and D low in pressure. In a neutral (P, N) range, all of the pressure passages A, B, C and D are rendered low in pressure. In a reverse (R) range, the manually operated valve 60 puts the pressure passages A and D into communication with the line pressure PL or the control pressure PC to render the pressure passages B and C low in pressure. The hydraulic circuit in FIG. 1 is shown with the forward range selected. Clutch and brake are engaged and released as in TABLE I below by changeover operation of the manually operated valve 60 and by control of the oil pressure output which is made by solenoid valves 2, 3, 4 and 5. In TABLE I, the circular marks stand for engagement, while X marks stand for release.

TABLE I

|      | R/C | 2$^{ND}$/B | OD/C | UD/C | LR/B |
|------|-----|------------|------|------|------|
| R    | O   | X          | X    | X    | O    |
| P, N | X   | X          | X    | X    | X    |
| 1    | X   | X          | X    | O    | O    |
| 2    | X   | O          | X    | O    | X    |
| 3    | X   | X          | O    | O    | X    |
| 4    | X   | O          | O    | X    | X    |

Figure 4:
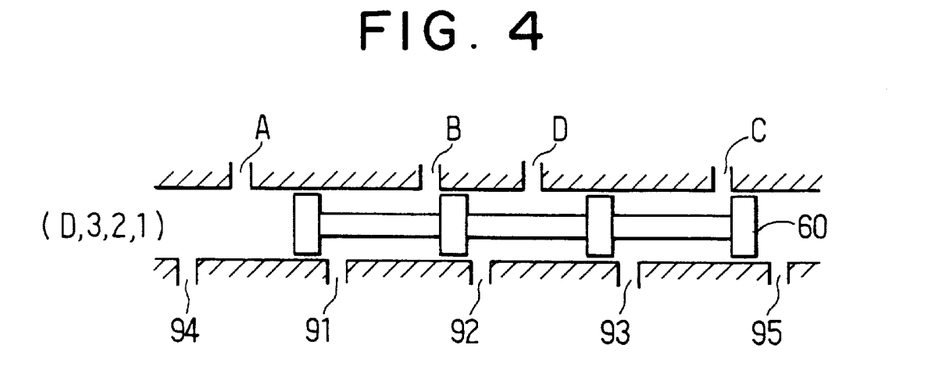
FIG. 4 is a sectional view showing the operation of a manually operated valve in forward gear shift ranges in the embodiment.
Figure 5:
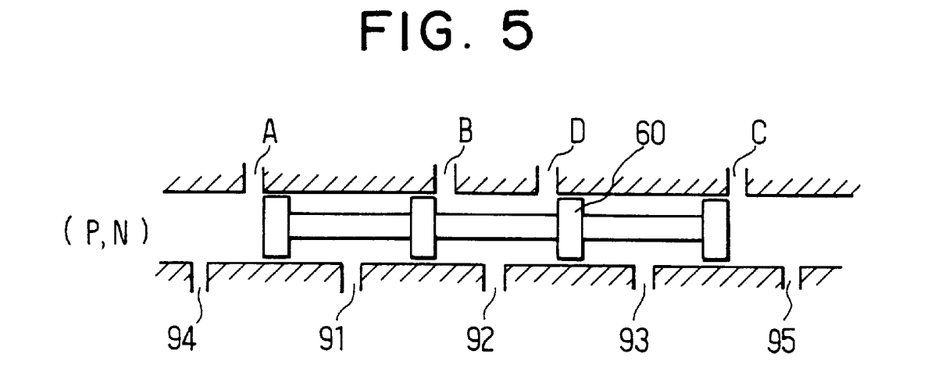
FIG. 5 is a sectional view showing the operation of the manually operated valve in a neutral gear shift range in the embodiment.
Figure 6:
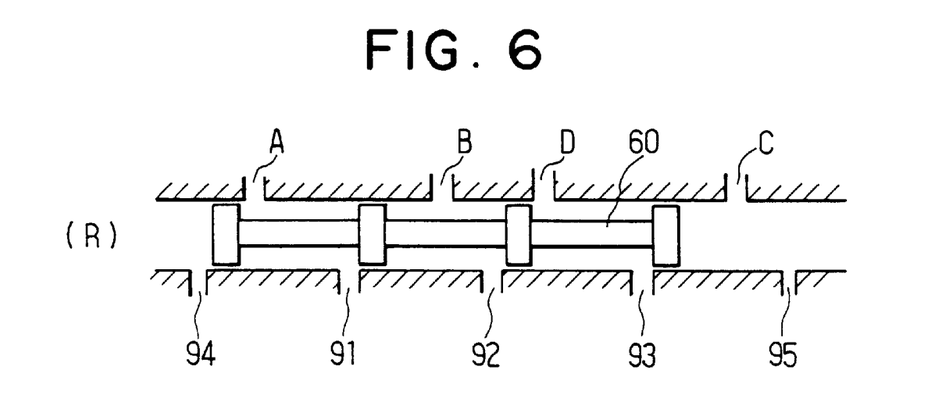
FIG. 6 is a sectional view showing the operation of the manually operated valve in a reverse gear shift range in the embodiment.
Figure 9:
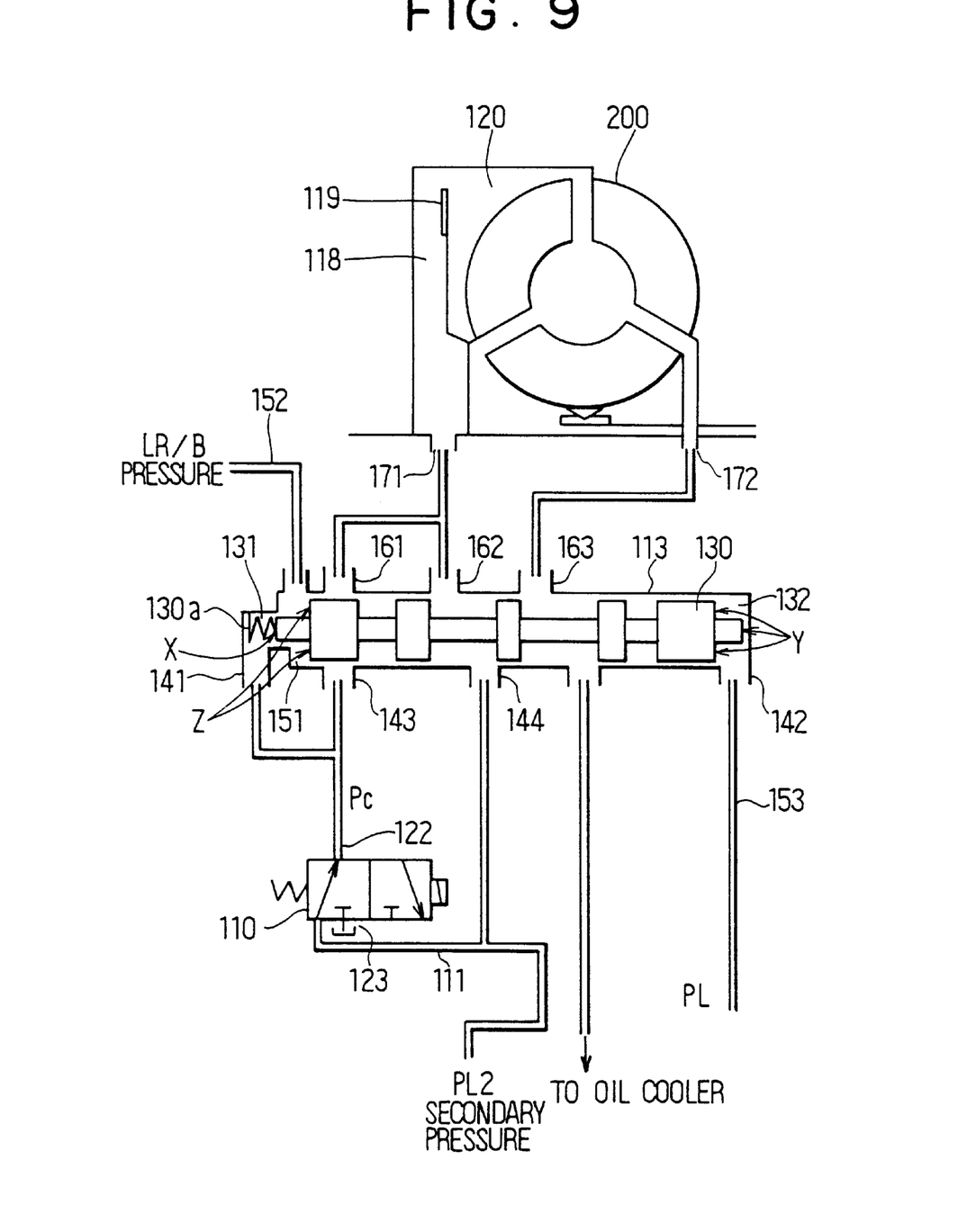
FIG. 9 is a construction diagram showing a lockup control unit for the automatic transmission.
Figure 10:
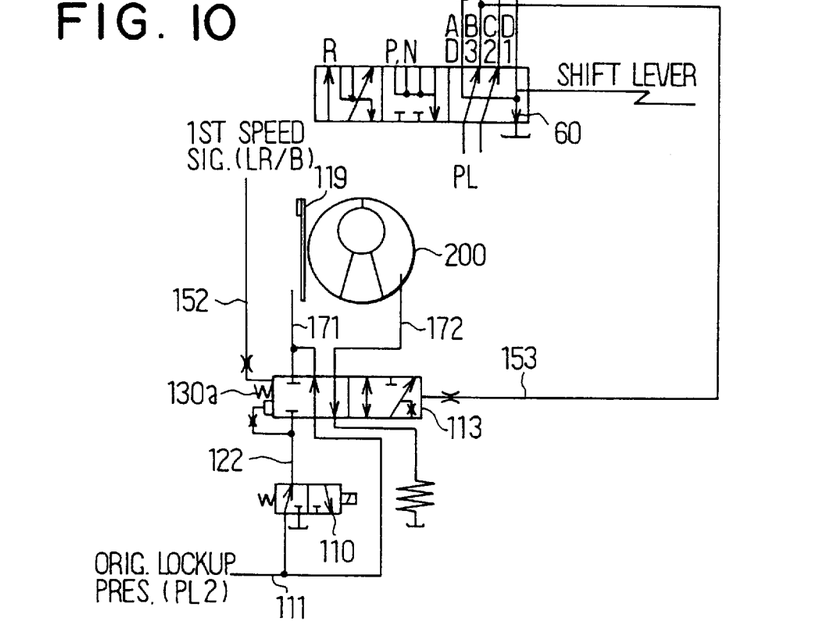
FIG. 10 is a schematic hydraulic circuitry diagram showing the lockup control unit in a low speed range according to the embodiment.
Figure 11:
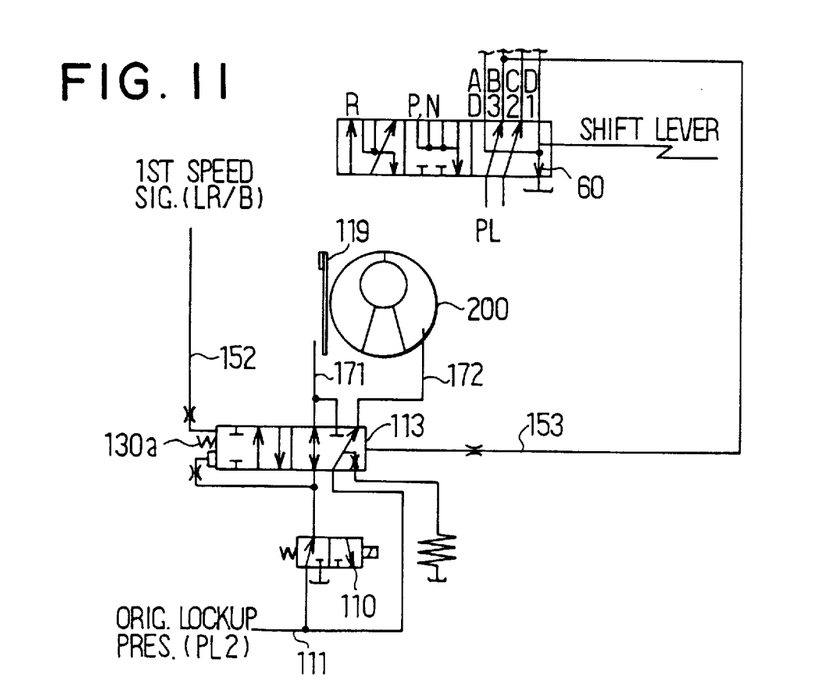
FIG. 11 is a schematic hydraulic circuit diagram showing the lockup control unit in second and higher speed ranges according to the embodiment.

A concrete construction of a manually operated valve 60 (somewhat simplified as will become apparent in connection with FIGS. 9–11) is shown in FIGS. 4–6, which represent forward (D, 3, 2, 1) ranges, a neutral (P, N) range and a reverse (R) range, respectively.

In FIG. 4, a port 91 is a line pressure passage, ports 92, 94 and 95 are drain passages, and a port 93 is a control pressure passage which is an output passage of the solenoid valve 3. The pressure passages B, C, A and D are in communication with the ports 91, 93, 94 and 92, respectively.

In the neutral range shown in FIG. 5, the manually operated valve 60 shifts to the left from its position shown in FIG. 4, and all of the pressure passages A, B, C and D are in communication with the drain passages.

In the reverse range shown in FIG. 6, the manually operated valve 60 shifts to the left a larger distance than in FIG. 5, in which the pressure passages A and D are in communication with the ports 91 and 93, respectively. The pressure passages B and C are in communication with drain passages.

In this way, forward, neutral and reverse ranges are established by changeover of oil paths in the three positions shown in FIGS. 4–6.

Figure 7:
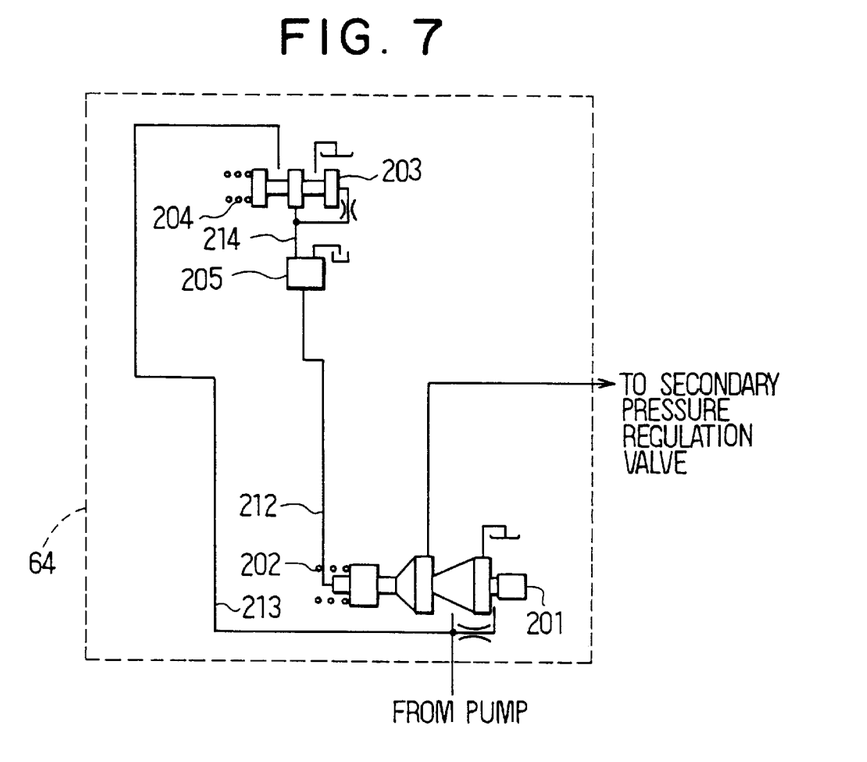
FIG. 7 is a schematic circuitry diagram showing a line pressure controller used in the hydraulic pressure control system.

As shown in FIG. 7, the line pressure control unit 64 is composed of a primary pressure regulating valve 201 as a pressure regulating valve which generates a line pressure PL, a solenoid valve 205 for applying a command pressure to the primary pressure regulating valve 201, a pressure reducing valve 203 for setting the oil pressure in the output passage 214 at a level below a predetermined level, and a secondary pressure regulating valve 220 which generates a secondary pressure PL2. The secondary pressure regulating valve 220 is not shown in FIG. 7.

Figure 8:
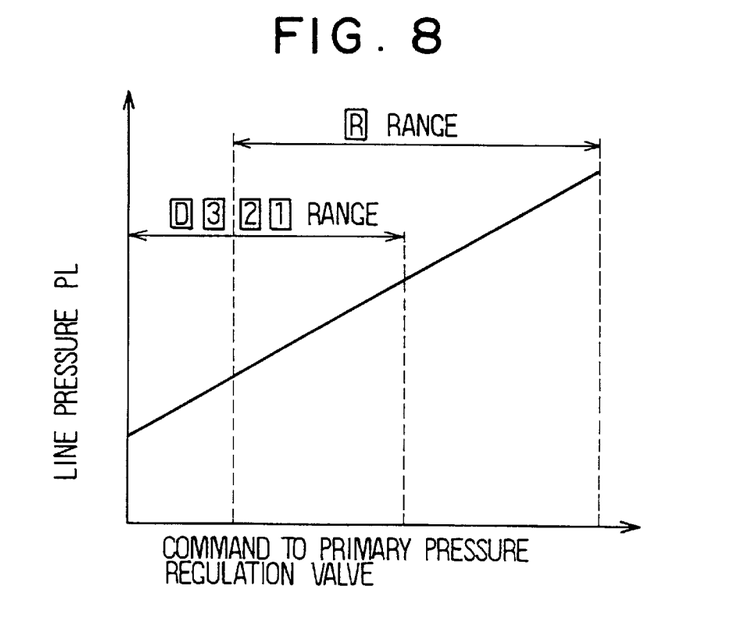
FIG. 8 is a characteristic diagram showing a relation between a command pressure and a line pressure in the embodiment.

The position of the primary pressure regulating valve 201 is determined by the balance between the total force, which is the total of the force based on the oil pressure of a control passage 212 and the biasing force of a spring 202, and the force based on the oil pressure of a line pressure passage 213. The line pressure PL in the line pressure passage 213 is determined by the balance of forces in the primary pressure regulating valve 201. As shown in FIG. 8, the oil pressure in the line pressure passage 213 increases with an increase in oil pressure (command pressure) of the control passage 212. The primary pressure regulating valve 201 and the secondary pressure regulating valve 220 are connected to each other through an oil path. An initial pressure of the hydraulic pressure to be applied to the lockup device is generated in the secondary pressure regulating valve 220.

The position of the pressure regulating valve 203 is determined by the balance between the force based on the oil pressure in the output passage 214 and the biasing force of a spring 204, and it functions to reduce the oil pressure in the output passage 214 to a level below a predetermined level.

The solenoid valve 205 is a duty-controllable three-way solenoid valve. By performing duty control according to a throttle valve opening and a selected shift range, the solenoid valve 205 controls the oil pressure in the control passage with a high accuracy from a low pressure up to a maximum command pressure which is the oil pressure in the output passage 214. The oil pressure in the control passage 212 increases with an increase in the degree of opening of the throttle valve and it is controlled so that the maximum value is larger in the reverse (R) range than in the forward (D,3,2,1) ranges.

As shown in FIG. 9, the lockup unit 65 is composed of a solenoid valve 110 and a lockup changeover valve 113, and it controls the oil pressure to be applied to a lockup clutch 119. The solenoid valve 110, lockup changeover valve 113 and the lockup clutch 119 correspond to "control means", "changeover valve," and "lockup device," respectively, which are described in the claims.

The solenoid valve 110 is controlled in accordance with a lockup control command for a torque converter 200, and it has a so-called duty-controllable construction wherein the opening of the solenoid valve 110 is controlled in accordance with the ratio between ON time and OFF time. When the solenoid valve 110 is not supplied with an electric current, it is held at its position shown in FIG. 9 by virtue of a spring, so that ports 111 and 122 come into communication with each other, while ports 122 and 123 come out of communication with each other. The secondary pressure PL2 is taken from the port 122 as control pressure PC, which is supplied to the port 111. At this time, the control pressure PC is equal to the secondary pressure PL2.

When the solenoid valve 110 is supplied with an electric current, the ports 122 and 123 come into communication with each other, while the communication between the ports 111 and 122 is cut off. Consequently, the port 122 comes into communication with the drain, and a control pressure PC equal to the drain pressure is taken out from the port 122. By switching ON and OFF from one to the other at a high speed for the solenoid valve 110 it becomes possible to make a control so that the control pressure PC capable of being taken out from the port 122 is smaller than the secondary pressure PL2. Further, by controlling the switch-over period, the control pressure PC can be set at a desired value.

At one axial end of the changeover valve 113 are formed oil pressure chambers 131 and 151 which are isolated from each other, while at the other axial end is formed an oil pressure chamber 132. The position of a valve member 130 of the changeover valve 113 is determined by both the force which the valve member 130 receives from the oil pressure applied to the oil pressure chambers 131, 132 and 151 and the biasing force of a spring 130a. The force acting on the valve member 130 from the oil pressure chambers 131 and 151 and the force acting thereon from the oil pressure chamber 132 are exerted in opposite directions for the valve member 130, and the urging force of the spring 130a is exerted in the same direction as the direction of the force acting on the valve member 130 from the oil pressure chambers 131 and 151, namely in the rightward direction. The valve member 130 has pressure receiving faces X, Y and Z which face the oil pressure chambers 131, 132 and 151, respectively. Pressure receiving areas of the faces X, Y and Z are determined so that when the secondary pressure PL2 is applied to the oil pressure chamber 131 and the line pressure PL is applied to the oil pressure chambers 131 and 151, the force acting on the valve member 130 from the oil chambers 131 and 151 and the force acting on the valve member 130 from the oil pressure chamber 132 become equal in magnitude to each other.

Now, the operation of the lockup controller 65 will be described below with reference to FIGS. 9–11.

(1) In the forward low-speed range, the supply of an electric current to the solenoid valve 110 is cut off so that the solenoid valve 110 is held at its position shown in FIGS. 9 and 10. Consequently, the ports 111 and 122 come into communication with each other, and a control pressure PC equal to the secondary pressure PL2 is taken out from the port 122, so that the secondary pressure PL2 acts on the oil pressure chamber 131 of the lockup changeover valve 113 through a port 141. In the forward ranges, the line pressure PL is applied to the pressure passage B through the manually operated valve 60, and the pressure passage 153 serving as a "forward range detecting means" which communicates with the pressure passage B is also held at the line pressure PL which is a high pressure. As a result, the internal pressure of the oil pressure chamber 132 which communicates with the pressure passage 153 also becomes equal to the line pressure PL. In the low speed range, since the high line pressure PL is applied to LR/B via the solenoid valve 5 and the fail safe valve 7, the line pressure PL is applied also to a pressure passage 152 which communicates with the output side of the fail safe valve 7, and it is also exerted on the oil pressure chamber 151.

In such a state wherein the secondary pressure PL2 is applied to the oil pressure chamber 131 and the line pressure PL applied to the oil pressure chambers 132 and 151, (1)—the force acting on the valve member 130 is determined from the product of the pressure receiving face X and the secondary pressure PL2 exerted on the oil pressure chamber 131, (2)—the force acting on the valve member 130 determined from the product of the pressure receiving face Y and the line pressure PL exerted on the oil pressure chamber 132, and (3)—the force acting on the valve member 130 determined from the pressure receiving face Z and the oil pressure of the LR/B applied to the oil pressure chamber 151, namely the line pressure PL, are in balance with one another, so that the valve member 130 tries to hold its neutral position. However, by virtue of the spring 130a, the valve member 130 moves to the right in FIG. 9 and is held at its position shown in FIGS. 9 and 10. As a result, the secondary pressure PL2 is exerted on a clutch releasing oil chamber 118 via ports 144, 162 and an off port 171. Further, a clutch engaging oil chamber 120 comes into communication with an oil cooler via an on port 172 and a port 163. Consequently, in the forward low-speed range, the lockup clutch 119 is released into a non-lockup state.

(2) In the forward second-, third- and fourth-speed ranges, the solenoid valve 110 is duty-controlled. In this state, the on-off time ratio of the solenoid valve 110 is controlled so that the control pressure PC taken out from the port 122 becomes lower than the secondary pressure PL2. Accordingly, the internal pressure of the oil pressure chamber 131 also becomes lower than the secondary pressure PL2. Further, since the output of the solenoid valve 5 is controlled to a low pressure, the internal pressure of the pressure passage 152 becomes low, and the oil pressure in the oil pressure chamber 151 is lowered to the drain pressure. In the forward ranges, the line pressure PL is applied to the pressure passage 153 irrespective of a gear shift, so that the internal pressure of the oil pressure chamber 132 also becomes equal to the line pressure PL.

Thus, with the control pressure PC lower than the secondary pressure PL2 applied to the oil pressure chamber 131, the line pressure PL applied to the oil pressure chamber 132 and the drain pressure applied to the oil pressure chamber 151, the valve member 130 is moved leftward in FIG. 9 by virtue of the following forces: (1)—a force obtained from the product of the pressure receiving face X and the control pressure PC which is lower than the secondary pressure PL2, (2)—a force obtained from the product of the pressure receiving face Y and the line pressure PL, and (3)—a force obtained from the product of the pressure receiving face Z and the drain pressure. The force acting leftward in FIG. 9 on the valve member 130 from the oil pressure chambers 131, 132 and 151 is larger than the urging force of the spring 130a, so that the valve member 130 moves to its position shown in FIG. 11 from its position shown in FIGS. 9 and 10.

This movement of the valve member 130 provides communication between a port 143 of the lockup changeover valve 113 and ports 161, 162 of the same valve, so that the control pressure PC taken out from the port 122 of the duty-controlled solenoid valve 110 is exerted on the clutch releasing oil chamber 118 through the off port 171. At the same time, the ports 144 and 163 of the lockup changeover valve 113 come into communication with each other. Consequently, the secondary pressure PL2 acts on the on port 172 of the torque converter 200, and the internal pressure of the clutch engaging oil chamber 120 becomes equal to the secondary pressure PL2. The lockup clutch 119 is controlled to a medium position according to the difference between the control pressure PC of the clutch releasing oil chamber 118 and the secondary pressure PL2 of the clutch engaging oil chamber 120. In this way there is performed a so-called slip control. The state of slip of the lockup clutch 119 is controlled by the duty control for the solenoid valve 110. By gradually decreasing the control pressure PC fed to the clutch releasing oil chamber 118, the lockup clutch 119 is engaged completely in a lockup state.

(3) In the neutral and reverse ranges, the supply of an electric current to the solenoid valve 110 is cut off, so that the internal pressure of the oil pressure chamber 131 becomes equal to the secondary pressure PL2 as in the foregoing low speed range. In both neutral and reverse ranges, moreover, since the pressure passage B comes into communication with the drain by changeover operation of the manually operated valve 60, the pressure in the pressure passage 152 and the pressure in the pressure passage 153 become low, and so do the internal pressures of the oil pressure chambers 151 and 132.

In accordance with such pressure setting for the oil pressure chambers 131, 132 and 151 the valve member 130 of the lockup changeover valve 113 is held in its position shown in FIGS. 9 and 10. In the neutral and reverse ranges, therefore, the lockup clutch 119 is released into a non-lockup state.

In the embodiment of the present invention described above, the following three oil pressures are introduced into the lockup changeover valve 113: (1)—the output of the solenoid valve 110 which causes the oil pressure applied to the clutch releasing oil chamber 118 of the lockup clutch 119 to vary in the range from a low pressure up to the secondary pressure PL2, (2)—the oil pressure applied to LR/B via the solenoid valve 5 and the fail safe valve 7 which oil pressure becomes high in the forward low-speed range and low in the other gear shift ranges including neutral and reverse ranges, and (3)—the output of the pressure passage B supplied via the manually operated valve 60 which output becomes high in the forward ranges and low in the neutral and reverse ranges. The mechanisms for generating these three oil pressures are not for the changeover operation of the lockup changeover valve 113 but for controlling the oil pressure to be applied to each frictional coupling element and lockup clutch. The lockup changeover valve 113, by introducing therein those three control oil pressures, determines a gear shift range in which the lockup clutch 119 is to be brought into an engagement permit state or an engagement inhibit state, and changes over the oil paths connected to the clutch releasing oil chamber 118 and the clutch engaging oil chamber 120. Thus, it is not necessary to use any special valve or the like that generates an oil pressure for only changeover operation of the lockup changeover valve 113. Accordingly, the hydraulic circuit of the lockup control unit can be reduced in size and simplified in structure.

Moreover, by appropriately setting the pressure receiving area of the valve member 130 which faces the oil pressure chambers 132 and 151 of the lockup changeover valve 113, the lockup changeover valve 113 can be held in its state shown in FIGS. 9 and 10 in the low speed range for engagement with LR/B irrespective of the output oil pressure of the solenoid valve 110. Thus, even in the event the solenoid valve 110 fails to operate, it is possible to create a non-lockup state in the low speed range.

When a heavy load is suddenly imposed on the engine, for example on a steep uphill road, and the ECU senses that this condition will lead to stoppage of the engine, the ECU issues a command to control the solenoid valves 2, 3, 4 and 5 to select the low speed range. In this way the lockup changeover valve 113 can be operated for prompt shift from the lockup state to the non-lockup state. Thus, it is possible to prevent engine stall caused by a sudden increase of load.

Although in the above embodiment lockup is inhibited in only the low speed range out of the forward ranges and lockup is permitted in the second, third and fourth speed ranges, lockup may be inhibited in any of the forward ranges, and not limited to the low speed range.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A hydraulic pressure control system for an automatic transmission in which a plurality of gear shift ranges are switched over from one to another by coupling and uncoupling each of a plurality of frictional coupling elements provided in the automatic transmission, said hydraulic pressure control system comprising:

a torque converter;

a lockup device, disposed adjacent to said torque converter, for transmitting power from a drive side of said system to said torque converter directly;

control means for controlling at least one of a locking oil pressure and an unlocking oil pressure to be applied to said lockup device;

forward range detecting means for detecting a forward range of said system;

gear shift range detecting means for detecting a gear shift range of said system; and a changeover valve for changing over oil paths connected to said lockup device to bring said lockup device into one of a lock permit state and a lock inhibit state;

wherein said changeover valve changes over said oil paths in accordance with oil pressure signals from said control means, said forward range detecting means and said gear shift range detecting means.

2. The system of claim 1, wherein a pressure for detecting a forward range is introduced to said forward range detecting means through a manually operated valve interlocking with a shift lever.

3. The system of claim 1, wherein a pressure for determining a forward range and a pressure for determining a gear shift range to inhibit lock of said lockup device are respectively exerted on said changeover valve in directions opposite to each other by said forward range detecting means and said gear shift range detecting means.

4. The system of claim 3, wherein a pressure for detecting a forward range is introduced to said forward range detecting means through a manually operated valve interlocking with a shift lever.

5. The system of claim 3, wherein the gear shift range for inhibiting the lock of said lockup device is a low speed range.

6. The system of claim 5, wherein a pressure for detecting a forward range is introduced to said forward range detecting means through a manually operated valve interlocking with a shift lever.

7. A hydraulic pressure control system comprising:

a torque converter;

a lockup clutch for directly transmitting power to said torque converter in a lockup state;

changeover means connected to said lockup clutch;

a control valve, connected to said changeover means, for receiving a first control pressure and, responsive to a first control signal, selectively applying said first control pressure to said lockup clutch;

a first passage for applying a second control pressure directly to said changeover means; and a second passage for applying a gear shift pressure representative of a gear shift range to said changeover means;

wherein said changeover means is for selectively applying said first control pressure to said lockup clutch in accordance with said first control pressure, said second control pressure and said gear shift pressure.

8. The system of claim 7, wherein said control valve is further for selectively discharging pressure from said lockup clutch.

9. The system of claim 7, wherein said changeover means operates in accordance with a balance of said first and second control pressures, and said gear shift pressure.

10. The system of claim 7, further comprising:
   a third passage for applying said first control pressure to said changeover means;
   wherein said changeover means is for, in a first position, applying said first control pressure to said lockup clutch independently of said control valve via said third passage.

11. The system of claim 10, wherein said changeover means is further for decreasing pressure in an oil chamber of said clutch in said first position.

12. The system of claim 7, wherein said changeover means is for, in a second position, applying said first control pressure to said lockup clutch responsive to said control valve.

13. The system of claim 12, wherein said changeover means is further for applying said first control pressure to an oil chamber of said lockup clutch in said second position.

14. A hydraulic pressure control system for an automatic transmission in which a plurality of gear shift ranges are switched over from one to another by coupling and uncoupling each of a plurality of frictional coupling elements provided in the automatic transmission, said hydraulic pressure control system comprising:

a torque converter;

a lockup device, disposed adjacent to said torque converter, for transmitting power from a drive side of said system to said torque converter directly;

a controller for controlling at least one of a locking oil pressure and an unlocking oil pressure to be applied to said lockup device;

a forward range detector for detecting a forward range of said system;

a gear shift range detector for detecting a gear shift range of said system; and a changeover valve for changing over oil paths connected to said lockup device to bring said lockup device into one of a lock permit state and a lock inhibit state;

wherein said changeover changes over said oil paths in accordance with oil pressure signals from said controller, said forward range detector, and said gear shift range detector.

* * * * *